W. H. HOSKEN.
SLAUGHTERING APPARATUS.
APPLICATION FILED OCT. 30, 1918.
1,313,383. Patented Aug. 19, 1919.
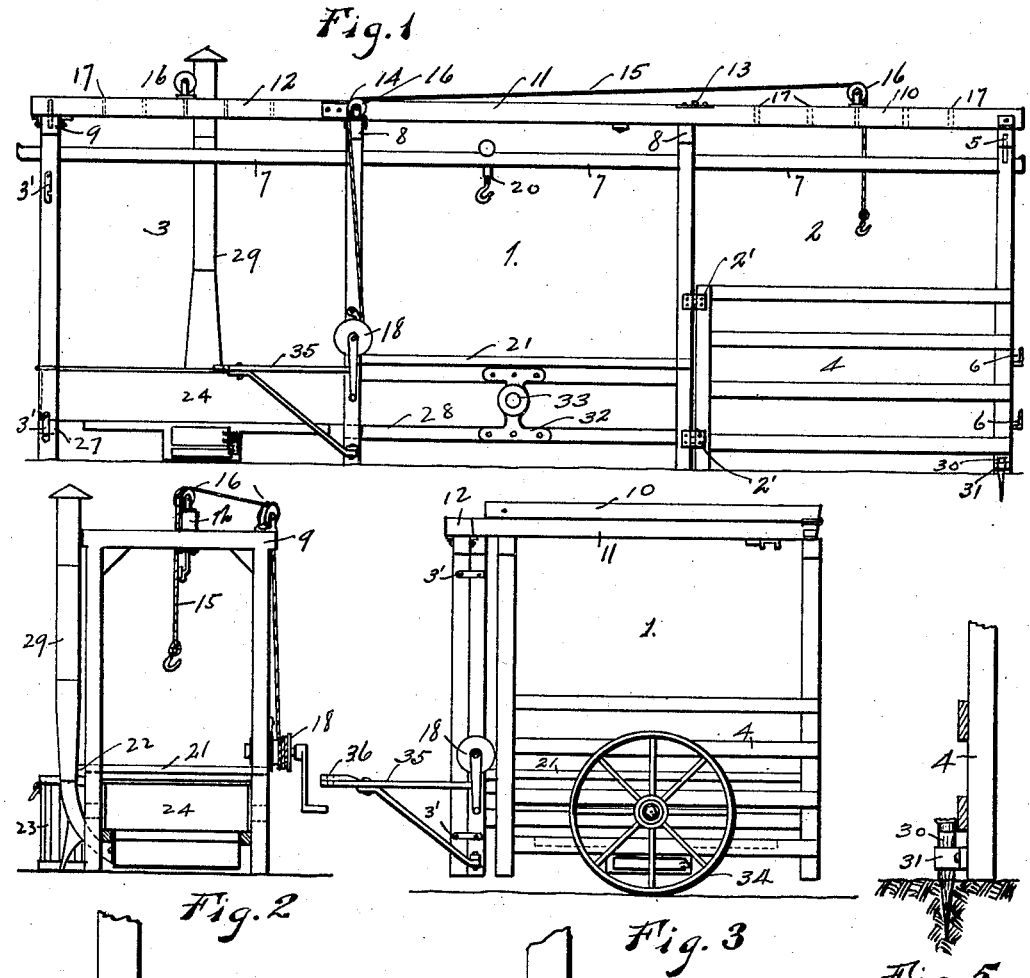
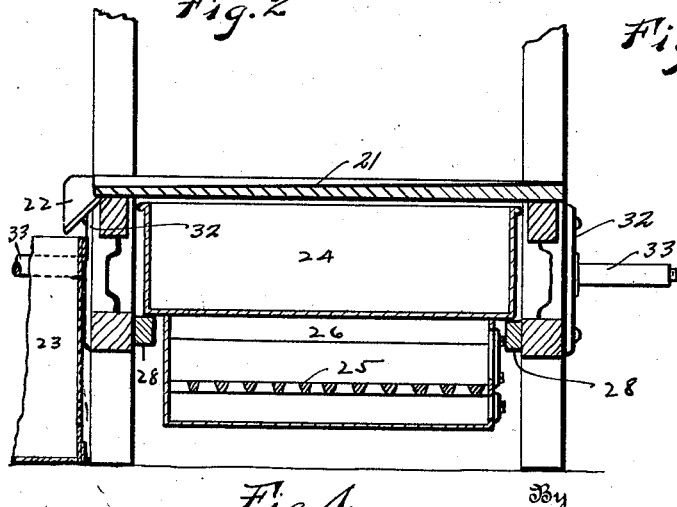
Inventor
William H. Hosken
By Herbert E. Smith
Attorney

UNITED STATES PATENT OFFICE.

WILLIAM H. HOSKEN, OF WARLAND, MONTANA.

SLAUGHTERING APPARATUS.

1,313,383.  Specification of Letters Patent.  Patented Aug. 19, 1919.

Application filed October 30, 1918. Serial No. 260,341.

*To all whom it may concern:*

Be it known that I, WILLIAM H. HOSKEN, a citizen of the United States, residing at Warland, in the county of Lincoln and State of Montana, have invented certain new and useful Improvements in Slaughtering Apparatus, of which the following is a specification.

The present invention relates to an improved slaughtering apparatus, designed especially as a portable butchering device for domestic use, with the special view to compactness, facility in operation, and equal facility in transportation of the apparatus. By the utilization of the apparatus of the invention, the farmer may with facility and despatch carry out his butchering operations, at any desired location, and the animal be slaughtered and dressed with convenience and the saving of both time and labor to the farmer. The portability of the apparatus renders it especially desirable as a community service utility, and because of its simplicity in construction and operation the apparatus commends itself for use.

The invention essentially resides in the apparatus involving a structure which comprises foldable and contractible parts which may be operated to fashion the apparatus for transportation on wheels, and in certain other novel combinations and arrangements of parts as will be hereinafter more fully pointed out and claimed.

In the accompanying drawings one complete example of the physical embodiment of the invention is illustrated, the parts being combined and arranged according to the best mode so far devised for the practical application of the principles of the invention.

Figure 1 is a side elevation of the apparatus, set up and ready for use and embodying the invention.

Fig. 2 is an end view of the apparatus, looking from the left in Fig. 1.

Fig. 3 is a side elevation of the apparatus, compacted, mounted on wheels, and ready for transportation to its desired destination.

Fig. 4 is an enlarged, detail, sectional view showing the scalding tank and heater and supports therefor, and the cutting table and drain board, the trunnions for the wheels also being shown herein.

Fig. 5 is a detail view showing manner of anchoring the apparatus, or rather the slaughter-pen of the apparatus, to add stability when required.

In the preferred embodiment of the invention as illustrated there are three main sections 1, 2, and 3, the center section 1 forming the body of the apparatus, the section 2 being a foldable structure on the vertical hinges 2', and the contractible or contractile section 3 being adapted for close contact with the body frame and supported therefrom by latches 3' when fixed for transportation. The section 2 is the pen and is made up of the two side members that are connected by the upper cross bar 5, and retaining bars may be placed in the hooks 6, 6, to retain the animal in the pen. Throughout the length of the apparatus, when extended, is arranged a meat-track 7, properly supported, and preferably in sections, so that it may be stored or packed away with convenience, when the apparatus is to be transported.

The body frame 1 has a pair of cross bars or braces 8, 8, and the contractile frame has a similar cross brace 9, all alined with the cross bar 5 of the folding frame section, and these four cross bars or braces, support the hinged, longitudinal, brace comprising the three sections 10, 11, and 12, the end section 10 being hinged at 13 to swing upward and fold over on the intermediate section 11, which, of course is rigidly fastened to the body section, and the end section 12 is hinged at 14 to the intermediate section 11, to swing around horizontally alongside the intermediate section when packing the parts. Suitable fastening or locking means are provided to secure the longitudinal brace to the two end sections to hold the parts rigid and stable, and this, central, longitudinal brace forms the support for the hoisting rope 15 which is supported on movable pulleys 16 supported in sockets 17 (dotted lines) in the end sections 10 and 12, and by means of the drum 18 the rope may be operated to hoist and convey the animal after being slaughtered in the pen section 2. The slaughtered animal after being hoisted to position is suspended from the hanger 20, which is suspended and movable on the track 7, and the animal is conveyed to the intermediate or body section and then deposited on the cutting table 21, which is laterally inclined toward the refuse slide 22, where the usual cutting and dressing takes place, the refuse being disposed of in the refuse can 23.

In the section 3, the scalding and singeing of the animal are accomplished, and for this purpose the usual scalding tank 24 is provided which is heated from the fire in grate 25 through the heating chamber 26. The scalding apparatus, when in position for use, has its metal tank 24 resting at one end upon the lower cross bar 27 of the section 3, and its other end rests upon the two side, supporting and guiding ribs 28, 28 that are rigidly fixed in the body frame or section 1. Thus, when the apparatus is to be compacted, the smoke pipe or flue 29 is detached from the heating apparatus, and then when other parts are adjusted, the tank may slide along to the right in Fig. 1 over the guide ribs as seen in Fig. 4. Preferably the tank is fixed to the cross bar 27 and thus forms a brace to hold the parts rigid and support the heating apparatus. The weight of the apparatus is usually sufficient to render it stable, but if required, the pen may be anchored by using a stake 30 in the socket 31 on the side frame 4 of the pen, the stake being driven securely into the ground as an anchor.

For transportation purposes, the body frame or section has a pair of alined brackets 32 each having a stub axle 33, upon which the wheels 34 are journaled, and at the end of the body frame are swiveled a pair of cranes 35 which, when swung toward each other, overlap, and at 36 are adapted to receiving the coupling or draft pin so that the apparatus is ready to be drawn by horse power, or by motor power as desired.

Inasmuch as the different animals, as hogs and beef, require different treatment, different parts of the apparatus are appropriated for different uses to suit the conditions. For instance, two or three animals may be hanging, by hooks 20, from the track 7 over the scalding tank, and in order to gain access to the animals for dressing them, the tank may be slid along on the ribs 28 within the central or body section, out of the way. It will be apparent that the hoisting or elevating and conveying rope may be utilized at different parts of the apparatus for different purposes. The simplicity of construction and operation of the apparatus is apparent, and the utility, together with its convenience, will at once be appreciated.

What I claim is:—

1. The combination with the body section, of an end section hinged to fold compactly therewith and when extended forming an animal pen, a second end section slidable with relation to the body section, an upper longitudinal brace fixed to the body section and provided with hinged locking and bracing members for the end sections, a cutting table supported in the body section, and a scalding apparatus supported in the slidable section.

2. The combination with the body section, of an extensible section adapted to telescope therewith and a longitudinal bar fixed to the body section and having a hinged member to engage the telescopic section when extended, a scalding tank in operative position supported between the two sections, and supporting guide ribs on the body section to receive the tank when the two sections are brought together.

3. The combination with the body section, of a pen comprising two frames hinged thereto and retaining devices on these frames, a second end frame longitudinally extensible from the body section, a longitudinal, upper, hinged bar bracing the three sections, and hoisting and conveying apparatus, said body section having a cutting table, and said extensible frame supporting a scalding device.

In testimony whereof I affix my signature.

WILLIAM H. HOSKEN.

Copies of this patent may be obtained for five cents each, by addressing the "Commissioner of Patents, Washington, D. C."